United States Patent Office 2,928,912
Patented Mar. 15, 1960

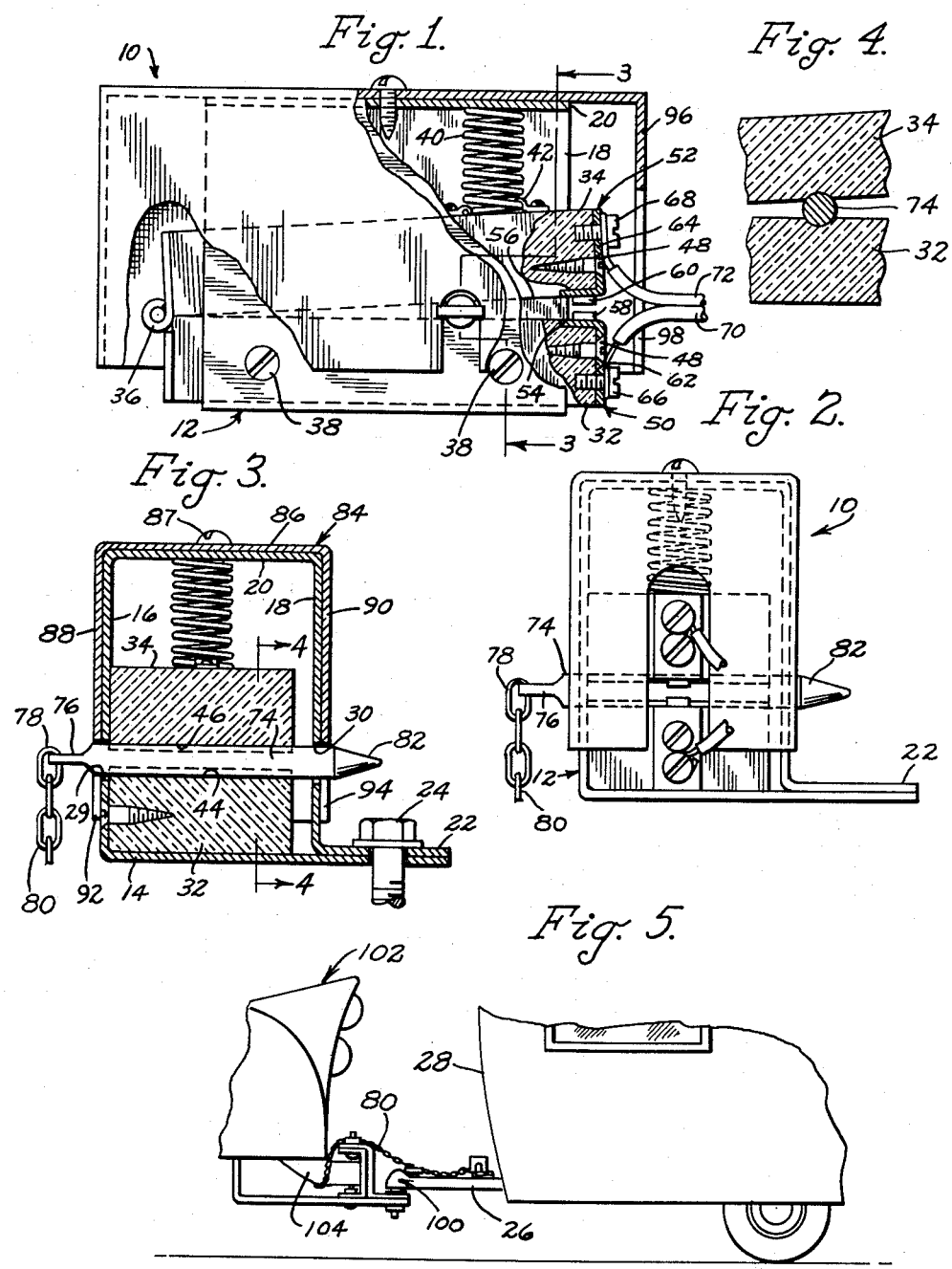

2,928,912

TRAILER BREAK-AWAY SWITCH

Peter Molnar, Jr., Perth Amboy, N.J.

Application July 22, 1958, Serial No. 750,203

3 Claims. (Cl. 200—61.19)

This invention relates to a trailer break-away switch to effect the application of electrically actuated trailer brakes and, more specifically, the invention pertains to a single pole single throw switch connected in an electric circuit for controlling conventional electrically operated trailer brakes.

One of the primary objects of this invention is to provide a normally open electric switch connected in the control circuit of electrically operated brakes for a towed vehicle such as a trailer, the switch being automatically actuated to close the control circuit upon separation of the trailer from its towing vehicle whereby the brakes of the towed vehicle are automatically applied.

Another object of this invention is to provide a positively actuated control switch of the type referred to above with suitable housing to protect the same from inclement weather as well as accumulations of dust, dirt and other debris normally encountered under road conditions.

A further object of this invention is to provide a switch of the type described generally supra which may be readily installed on conventional cars, the same being accomplished without the use of special tools.

Still another object of this invention is to provide an improved switch suitable for its attendant function as referred to above and which is simple, compact, and rugged in construction.

This invention contemplates, as a further object thereof, the progression of a trailer break-away switch which is non-complex in construction and assembly, inexpensive to manufacture, and durable in use.

Other and further objects and advantages of the instant invention will become more evident from a consideration of the following specification when read in conjunction with the annexed drawing, in which:

Figure 1 is a side elevational view, partially broken away, of a trailer break-away switch constructed in accordance with the instant invention;

Figure 2 is an end elevational view of the trailer break-away switch shown in Figure 1;

Figure 3 is a detail cross-sectional view taken substantially upon the line 3—3 of Figure 1, looking in the direction of the arrows;

Figure 4 is a fragmentary detail cross-sectional view taken substantially on the vertical plane of the line 4—4 of Figure 3, looking in the direction of the arrows; and Figure 5 is a fragmentary side elevational view illustrating the installation of the switch in connection with a trailer and the connection between the trailer and the towing vehicle.

Referring now more specifically to the drawing, reference numeral 10 designates, in general, a single pole single throw trailer break-away switch constructed in accordance with the teachings of this invention. The switch 10 includes an inner substantially rectangular housing 12 having a pair of opposed open ends and including a substantially rectangular base plate 14 which is bent to form a pair of oppositely disposed laterally spaced and confronting side walls 16, 18 integrally connected at their upper ends by a substantially rectangular top wall 20. The lower end of the side wall 18 is reverted to form a flange 22 which extends over a portion of the base plate 14 and both are apertured to receive therethrough a bolt 24 for connection with the draw bar 26 of a conventional trailer 28. To serve a function to be described, the side walls 16, 18 are formed with aligned apertures 29, 30.

Reference numerals 32, 34 designate a pair of substantially rectangular elements formed of a dielectric or electrically non-conductive material. The element 34 is superimposed over the element 32 and a pair of adjacent ends thereof are integrally connected at 36 by conventional means. The elements 32, 34 are disposed within the housing 12 and are fixedly secured therein by means of screws 38 which extend into the element 32.

The elements 32, 34 project from the opposed open ends of the housing 12 and interposed between the upper side of the element 34 is a helicoidal spring 40 under compression and which is retained in position by spring keepers 42 secured to element 34 whereby the element 34 is constantly biased for pivotal movement in the direction of the element 32. To serve a function to be described, the confronting sides of the elements 32, 34 are formed with transversely extending juxtaposed arcuate recesses designated at 44, 46.

To the other ends of the elements 32, 34 are secured by screws 48 a pair of identical L-shaped metallic brackets 50, 52 having confronting foot portions 54, 56, respectively, the foot portions having a switch contact 58, 60, respectively, secured thereon in juxtaposition relative to each other. The leg portions 62, 64 of the brackets carry binding posts 66, 68, respectively, to which are connected the ends of a pair of conductors 70, 72.

The contacts 58, 60 are normally held in spaced apart relation by means of an elongated cylindrical pin 74 which extends transversely of and between the elements 32, 34, the pin 74 being removably received within the recesses 44, 46. One end of the pin 74 is formed with a bight 76 that receives the eye 78 of a length of a flexible member 80 which may comprise heavy cord, chain, or other similar articles. The other end 82 of the pin 74 is tapered to facilitate concession between the elements 32, 34.

Reference numeral 84 connotes an elongated substantially rectangular casing having a lower open end. The casing 84 is telescoped over the housing 12 and encloses a top wall 86 superimposed on and secured to the top wall 20 by a screw 87, a pair of depending side walls 88, 90 which are formed with downwardly opening slots 92, 94 to fit over and around the opposite ends of the pin 74. The end wall 96 is also formed with a similar downwardly opening slot 98 to permit the passage of the conductors 70, 72 therethrough.

The draw bar 26 is connected through conventional hitch means 100 with the rear end of a towing vehicle 102 and the other end of the flexible member 80 may be connected with a conventional support bracket 104. The slack in the member 80 is sufficient so as to permit the turning of the vehicles without pulling the pin 74, but at the same time the length of the flexible member 80 is such as to pull the pin 74 just before existing trailer safety chains receive the strain resulting from a parting of the two vehicles.

Upon the withdrawal of the pin 74, the helicoidal spring 40 forces the element 34 to move towards the element 32 and to close the switch contacts 58, 60 which are connected in a conventional electric circuit to effect the immediate application of the trailer brakes, thereby preventing the runaway of the trailer.

Having described and illustrated one embodiment of this invention, it will be understood that the same is offered merely by way of example, and that the scope of the instant invention is to be limited only by the appended claims.

What is claimed is:

1. A single throw single pole switch comprising a pair of elongated substantially rectangular elements formed of a dielectric material and juxtaposed with respect to each other, said elements having a pair of adjacent ends integrally connected together and a switch contact carried on each of said elements in confronting relation relative to each other, a substantially rectangular housing having a pair of opposed top and bottom walls, said elements being disposed and secured within said housing with one of said elements in spaced relation relative to said top wall, resilient means interposed between said one element and said top wall constantly biasing said one element for movement towards the other of said elements to effect a closing of said contacts one against the other, and means removably interposed between said elements to hold, normally, said contacts from adjacent with each other, said means being insertable through said housing to effect separation of said one element relative to the other thereof.

2. A single throw single pole switch comprising a pair of elongated substantially rectangular elements formed of a dielectric material and juxtaposed with respect to each other, said elements having a pair of adjacent ends hingedly connected together and a switch contact carried on the ends of said elements opposed with respect to said hinged ends, said contacts being juxtaposed with respect to each other, a housing for said elements including a wall disposed in spaced relation relative to one of said elements, means fixedly securing said elements within said housing, resilient means interposed between said one element and said wall constantly biasing said one element for movement towards the other of said elements to effect closure of said contacts against each other, and a movable pin extending transversely of and between said elements to normally hold said contacts in spaced relation relative to each other, said pin being inserted through said housing to normally retain said contacts in said spaced relation.

3. In a multi-unit land vehicle whose units are separable and including a towing vehicle and a trailer vehicle which the latter is provided with an electric circuit for controlling conventional trailer brakes, said circuit including a vehicle unit normally open break-away switch which comprises a pair of elongated substantially rectangular elements formed of a dielectric material and juxtaposed with respect to each other, said elements having a pair of adjacent ends hingedly connected together and a switch contact carried on the end of each of said elements opposed with respect to said hinged ends, said contacts being juxtaposed with respect to each other and connected in said circuit, a housing for said elements including a wall disposed in spaced relation relative to one of said elements, means fixedly securing said elements within said housing, resilient means interposed between said one element and said wall constantly biasing said one element for movement towards the other of said elements to effect closure of said contacts against each other to thereby energize said circuit and effect application of said brakes, a removable pin extending transversely of and between said elements to normally hold said contacts in spaced relation relative to each other, means fixedly securing said switch to one of said vehicles and flexible means connected with said pin and with the other of said vehicles whereby the separation of said units will cause said pin to be removed from between said elements thereby permitting said contacts to close against one another.

References Cited in the file of this patent

UNITED STATES PATENTS

| | | |
|---|---|---|
| 1,307,575 | Beall | June 24, 1919 |
| 2,676,225 | Jubell | Apr. 20, 1954 |